(12) United States Patent  
Sasaki et al.

(10) Patent No.: US 11,144,273 B2
(45) Date of Patent: Oct. 12, 2021

(54) IMAGE DISPLAY APPARATUS HAVING MULTIPLE OPERATION MODES AND CONTROL METHOD THEREOF

(71) Applicant: CANON KABUSHIKI KAISHA, Tokyo (JP)

(72) Inventors: Masatsugu Sasaki, Yokohama (JP); Hirofumi Urabe, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 16/778,520

(22) Filed: Jan. 31, 2020

(65) Prior Publication Data
US 2020/0249903 A1 Aug. 6, 2020

(30) Foreign Application Priority Data

Feb. 5, 2019 (JP) .............................. JP2019-018724

(51) Int. Cl.
G06F 3/14 (2006.01)
G06F 3/147 (2006.01)

(52) U.S. Cl.
CPC ............ G06F 3/1454 (2013.01); G06F 3/147 (2013.01); G06F 3/1446 (2013.01)

(58) Field of Classification Search
CPC .... G06F 3/1423; G06F 3/1446; G06F 3/1454; G06F 3/147; G06F 3/1438; G09G 2340/14; G09G 2352/00; G09G 2370/04; G09G 2370/042; G09G 2370/16; G09G 5/14; G09G 3/002; G09G 3/003; G09G 3/2088; H04N 21/42221; H04N 21/43635; H04N 21/64792; G06T 3/40; H04L 67/10; H04W 84/20
See application file for complete search history.

(56) References Cited

U.S. PATENT DOCUMENTS

2002/0186212 A1* 12/2002 Matsumoto ...... H04N 21/42221
345/204
2004/0130568 A1* 7/2004 Nagano ............ H04N 21/64792
715/733
2009/0160731 A1* 6/2009 Schuler ................. G06F 3/1423
345/1.1

(Continued)

FOREIGN PATENT DOCUMENTS

JP 11-112893 A 4/1999
JP 2010-033004 A 2/2010
JP 2010-151869 A 7/2010

Primary Examiner — Richard J Hong
(74) Attorney, Agent, or Firm — Cowan, Liebowitz & Latman, P.C.

(57) ABSTRACT

A display apparatus that includes an acquisition interface for acquiring a plurality of image data, a communication interface for communicating with another display apparatus, a reception interface for receiving an operation relating to an image to be displayed on a display, and a processor which selects image data to be used for displaying an image on the display, from the plurality of image data, based on an operation received by the reception interface, controls the display to display an image based on selected image data, and controls communication with the other display apparatus via the communication interface so that the other display apparatus displays an image based on the selected image data.

13 Claims, 9 Drawing Sheets

(56) References Cited

U.S. PATENT DOCUMENTS

| | | | |
|---|---|---|---|
| 2010/0064260 A1* | 3/2010 | Amano | G06F 3/1438 715/859 |
| 2013/0007178 A1* | 1/2013 | Nahidipour | H04W 84/20 709/208 |
| 2014/0071099 A1* | 3/2014 | Kubota | G09G 3/002 345/179 |
| 2014/0119675 A1* | 5/2014 | Kim | G06T 3/40 382/299 |
| 2014/0285399 A1* | 9/2014 | Jain | G06F 3/1423 345/1.2 |
| 2015/0205565 A1* | 7/2015 | Koguchi | G09G 3/2088 345/1.3 |
| 2015/0287390 A1* | 10/2015 | Kakeko | H04L 67/10 345/1.1 |
| 2016/0132282 A1* | 5/2016 | Choi | G09G 3/003 345/1.3 |
| 2016/0313968 A1* | 10/2016 | Mihara | G06F 3/1446 |
| 2016/0335040 A1* | 11/2016 | Wen | G06F 3/1446 |
| 2018/0137839 A1* | 5/2018 | Kang | G06F 3/1446 |
| 2020/0249900 A1* | 8/2020 | Oh | H04N 21/43635 |

\* cited by examiner

FIG. 1
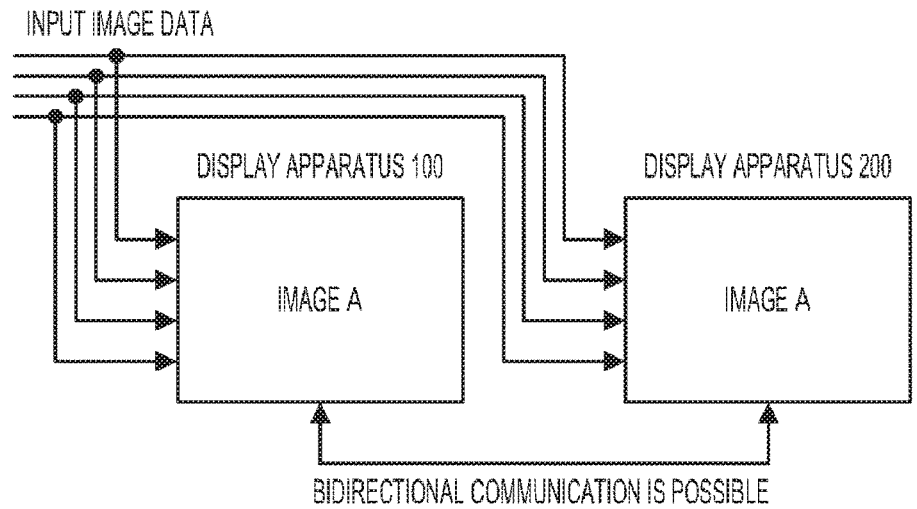
FIG. 2
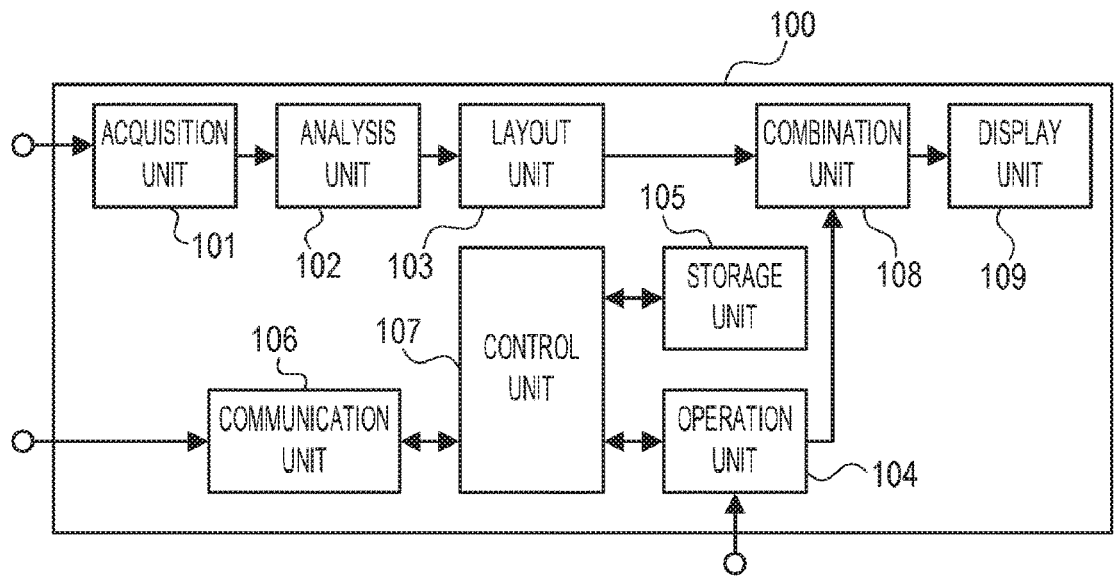
FIG. 3
| OPERATION MODE | LINKED MODE OFF |
| --- | --- |
| | LINKED MODE 1 (MASTER) |
| | LINKED MODE 1 (SLAVE) |
| | LINKED MODE 2 |

IMAGE DISPLAY APPARATUS HAVING MULTIPLE OPERATION MODES AND CONTROL METHOD THEREOF

BACKGROUND OF THE INVENTION

Field of the Invention

The present invention relates to a display apparatus and a control method thereof.

Description of the Related Art

There are a single-display that one image is displayed on one screen, and a multi-display that a plurality of images are arrayed and displayed on one screen, as types of displays (display layout) of a display apparatus.

In a filming location, sometimes, a plurality of images taken with a plurality of cameras are displayed in a multi-display on a single display apparatus, and an image selected from the plurality of displayed images is displayed in a single-display on another display apparatus. In other cases, the same image may be displayed in a single-display on discrete display apparatuses so that several persons in remote locations can check the same image.

In the filming location, a switcher is used to switch the images displayed (output) in each of the display apparatuses. With this method, however, it is not easy to display desired images on each display apparatus in a filming location where a switcher cannot fit in such as a confined filming location with limited space for equipment.

Japanese Patent Application Laid-open No. H11-112893 discloses a technique that uses a remote controller having a display and a switcher and executing a multi-display, one of a plurality of images displayed in the multi-display being selected and output to an external display apparatus (different from the remote controller).

With the technique disclosed in Japanese Patent Application Laid-open No. H11-112893, however, while the remote controller can control the display on the external display apparatus, the external display apparatus cannot control the display on the remote controller. Namely, while unidirectional control is possible, bidirectional control is not possible. Moreover, since the external display apparatus can only display images output from the remote controller, the user has to operate the remote controller when the user desires to switch the images displayed on the external display apparatus, which is cumbersome.

SUMMARY OF THE INVENTION

The present invention in its first aspect provides a display apparatus for displaying an image on a display, the display apparatus comprising:

an acquisition interface configured to acquire a plurality of image data;

a communication interface configured to communicate with an other display apparatus configured to acquire the plurality of image data;

a reception interface configured to receive an operation relating to an image to be displayed on the display; and at least one memory and at least one processor which function as:

selecting image data to be used for displaying an image on the display, from the plurality of image data, in accordance with an operation received by the reception interface;

controlling the display to display an image based on selected image data; and controlling communication with the other display apparatus via the communication interface so that the other display apparatus displays an image based on the selected image data.

The present invention in its second aspect provides a control method of a display apparatus for displaying an image on a display, the display apparatus comprising:

an acquisition interface configured to acquire a plurality of image data;

a communication interface configured to communicate with an other display apparatus configured to acquire the plurality of image data; and a reception interface configured to receive an operation relating to an image to be displayed on the display, and the control method comprising:

selecting image data to be used for displaying an image on the display, from the plurality of image data, in accordance with an operation received by the reception interface;

controlling the display to display an image based on selected image data; and controlling communication with the other display apparatus via the communication interface so that the other display apparatus displays an image based on the selected image data.

The present invention in its third aspect provides a non-transitory computer readable medium that stores a program, wherein the program causes a computer to execute a control method of a display apparatus for displaying an image on a display, the display apparatus comprising:

an acquisition interface configured to acquire a plurality of image data;

a communication interface configured to communicate with an other display apparatus configured to acquire the plurality of image data; and a reception interface configured to receive an operation relating to an image to be displayed on the display, and the control method comprising:

selecting image data to be used for displaying an image on the display, from the plurality of image data, in accordance with an operation received by the reception interface;

controlling the display to display an image based on selected image data; and controlling communication with the other display apparatus via the communication interface so that the other display apparatus displays an image based on the selected image data.

Further features of the present invention will become apparent from the following description of exemplary embodiments with reference to the attached drawings.

BRIEF DESCRIPTION OF THE DRAWINGS

FIG. 1 is a schematic diagram illustrating one example of a configuration of a display system;

FIG. 2 is a block diagram illustrating one example of a configuration of a display apparatus;

FIG. 3 is a schematic diagram illustrating one example of OSD image data;

DESCRIPTION OF THE EMBODIMENTS

First Embodiment

Figure 4:
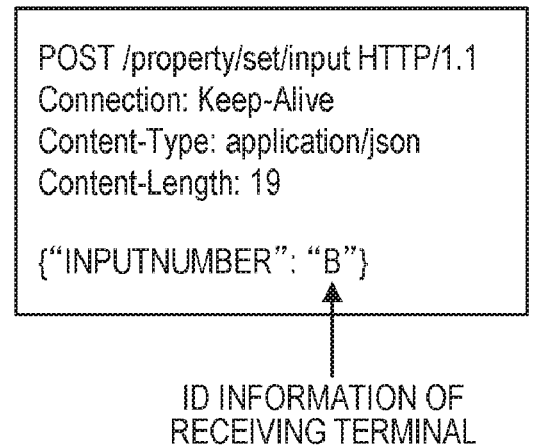
FIG. 4 is a diagram illustrating one example of an image switch request.

A first embodiment of the present invention will be described below. One example will be described in this embodiment where a plurality of display apparatuses are controlled to display the same image in a single-display. In a single-display, one image is displayed on one screen.

Configuration of Display System

FIG. 1 is a schematic diagram illustrating one example of the configuration of the display system according to this embodiment. As shown in FIG. 1, the display system includes a display apparatus 100 and a display apparatus 200. The display apparatus 100 and display apparatus 200 each acquire (receive) a plurality of image data either via a wired connection or wirelessly from an external device (such as a camera). For example, the display apparatus 100 and display apparatus 200 each acquire a plurality of image data via an SDI cable from an external device. The display apparatus 100 and display apparatus 200 are connected to each other either via a wired connection or wirelessly such as to be capable of mutual communication (bidirectional communication). For example, the display apparatus 100 and display apparatus 200 are connected to each other via a local area network (LAN) cable. The display system may include three or more display apparatuses connected to each other such as to be capable of mutual communication.

Configuration of Display Apparatus

FIG. 2 is a block diagram illustrating one example of the configuration of the display apparatus 100. The display apparatus 200 has the same configuration as the display apparatus 100. The display apparatus 200 carries out processes described below where "display apparatus 100" is read as "display apparatus 200", and "display apparatus 200" is read as "display apparatus 100". As shown in FIG. 2, the display apparatus 100 includes an acquisition unit 101 (an acquisition interface), an analysis unit 102, a layout unit 103, an operation unit 104 (a reception interface), a storage unit 105, a communication unit 106 (a communication interface), a control unit 107, a combination unit 108, and a display unit 109.

The acquisition unit 101 acquires a plurality of image data (a plurality of input image data) from an external device and outputs the plurality of input image data to the analysis unit 102. The acquisition unit 101 may be one terminal (receiving terminal) that receives a plurality of input image data, or a plurality of terminals that receive a plurality of input image data.

The analysis unit 102 analyzes the plurality of input image data output from the acquisition unit 101, and outputs the plurality of input image data and analysis results to the layout unit 103. For example, the analysis unit 102 acquires image information at least including one of resolution, number of effective pixels, total number of pixels, frame frequency, and payload from each of the plurality of input image data as analysis results. Payload is contained in a blanking region of an SDI signal that is input image data and indicates the characteristics (color format, color depth, frame frequency, and so on) of this SDI signal. Payload is the information defined by the SMPTE standards.

The layout unit 103 generates layout image data corresponding to a display layout (types of displays: single-display or multi-display) notified by the control unit 107 based on the plurality of input image data output from the analysis unit 102. The layout unit 103 then outputs the layout image data to the combination unit 108. The layout unit 103 carries out image processing such as scaling (enlarging or reducing in size), trimming and so on as required to generate the layout image data. The magnification of scaling (magnification factor or reduction factor) is determined, for example, based on a resolution notified by the analysis unit 102 (an image resolution indicated by the input image data) and a resolution of the display apparatus 100 (a resolution of an image displayed on the display surface).

In the case with a single-display, one of a plurality of images respectively corresponding to the plurality of input image data is displayed on the display surface of the display apparatus 100 (display unit 109). More specifically, the layout unit 103 selects one of the plurality of input image data, and generates layout image data in which an image based on the selected image data is laid out. The layout unit 103 switches selected image data from one another among the plurality of input image data in response to an image switch request output from the control unit 107. The image switch request is a request for switching the input image data to be used in the single-display and may be a request for switching the terminal (receiving terminal) to be used for the single-display, or not.

In the case with multi-display, the plurality of images respectively corresponding to the plurality of input image data are displayed in an array on the display surface of the display apparatus 100 (display unit 109). More specifically, the layout unit 103 generates layout image data in which the plurality of images based on the plurality of input image data are laid out.

The operation unit 104 can receive user operations such as a mode switch operation for switching operation modes, a layout switch operation for switching display layouts, an image switch operation for switching input image data to be used for the single-display, and so on. When a user operation is performed to the display apparatus 100, the operation unit 104 outputs information (request) in accordance with the performed user operation to the control unit 107. More specifically, the operation unit 104 notifies the control unit 107 of the operation mode that is switched to by a mode switch operation, and notifies the control unit 107 of the display layout that is switched to by a layout switch operation. The operation unit 104 also outputs an image switch request to the control unit 107 in accordance with an image switch operation.

In this embodiment, moreover, the operation unit 104 can generate on screen display (OSD) image data, and output the OSD image data to the combination unit 108. The OSD image data is graphical user interface (GUI) image data for assisting user operations, for example, and shows menus and the like. FIG. 3 is a schematic diagram illustrating one example of OSD image data (menu) that assists a mode switch operation. In this embodiment, the display apparatus 100 can be set to one of Linked Mode OFF, Linked Mode 1 (master), Linked Mode 1 (slave), and Linked Mode 2. The user can select one of Linked Mode OFF, Linked Mode 1 (master), Linked Mode 1 (slave), and Linked Mode 2, and the operation mode is set to the one selected by the user.

In this embodiment, Linked Mode OFF is selected when the display on the display apparatus 100 and the display on the display apparatus 200 are not to be linked (non-linked). Linked Mode 1 (master) and Linked Mode 1 (slave) are selected when the display on one of the display apparatus 100 and display apparatus 200 is to be linked to the display on the other one of the display apparatus 100 and display apparatus 200, but the display on the other one of the display apparatus 100 and display apparatus 200 is not to be linked to the display on the one of the display apparatus 100 and display apparatus 200 (unidirectional linking). The display on a display apparatus set to Linked Mode 1 (slave) is linked to the display on another display apparatus set to Linked Mode 1 (master). Linked Mode 2 is selected when the display on the display apparatus 100 and the display on the display apparatus 200 are to be mutually linked (bidirectional linking). In other words, Linked Mode 2 is selected when the display on the display apparatus 200 is to be linked to the display on the display apparatus 100, as well as the display on the display apparatus 100 is to be linked to the display on the display apparatus 200.

Linked Mode OFF, Linked Mode 1 (master), Linked Mode 1 (slave) and Linked Mode 2 are as detailed below.

Linked Mode OFF: Operation mode wherein an image switch request is not sent to the display apparatus 200, and even when an image switch request is received from the display apparatus 200, the received image switch request is not responded to.

Linked Mode 1 (master): Operation mode wherein an image switch request is sent to the display apparatus 200, but when an image switch request is received from the display apparatus 200, the received image switch request is not responded to.

Linked Mode 1 (slave): Operation mode wherein an image switch request is not sent to the display apparatus 200, and when an image switch request is received from the display apparatus 200, the image is displayed in response to the received image switch request.

Linked Mode 2: Operation mode wherein an image switch request is sent to the display apparatus 200, and when an image switch request is received from the display apparatus 200, the image is displayed in response to the received image switch request.

The storage unit 105 stores setting information indicative of the display layout, operation mode and the like of the display apparatus 100.

The communication unit 106 performs communication with the display apparatus 200. In this embodiment, the communication unit 106 sends and receives image switch requests to and from the display apparatus 200. The communication unit 106 outputs an image switch request output from the control unit 107 to the display apparatus 200, or outputs an image switch request output from the display apparatus 200 to the control unit 107. An image switch request output to the display apparatus 200 is an instruction cause the display apparatus 200 to execute a single-display using the same input image data as that of the single-display on the display apparatus 100. An image switch request output from the display apparatus 200 is an instruction to cause the display apparatus 100 to execute a single-display using the same input image data as that of the single-display on the display apparatus 200.

Let us assume a case where the image switch request is a request for switching the terminal (receiving terminal) to be used for the single-display. In this case, information that identifies the terminal that is switched to such as, for example, a data portion of a hypertext transfer protocol (HTTP) communication as shown in FIG. 4, is sent and received as the image switch request. The image switch request is also a request for switching the input image data to be used for the single-display. Therefore, information that identifies the input image data that is switched to may be sent and received as the image switch request.

The control unit 107 controls various processes of the display apparatus 100. In this embodiment, when a mode switch operation is performed and the operation mode that is switched to is notified from the operation unit 104 to the control unit 107, the control unit 107 records the information of the notified operation mode in the storage unit 105 (operation mode setting). When a layout switch operation is performed and the display layout that is switched to is notified from the operation unit 104 to the control unit 107, the control unit 107 records the information of the notified display layout in the storage unit 105 (display layout setting). The control unit 107 further acquires (reads out) the display layout information (setting information, or setting value, of the current display layout) from the storage unit 105 and notifies the layout unit 103 of the current display layout.

In this embodiment, when an image switch operation is performed and an image switch request is output from the operation unit 104 to the control unit 107, the control unit 107 outputs the image switch request output from the operation unit 104 to the layout unit 103. The control unit 107 then acquires the operation mode information (setting information, or setting value, of the current operation mode) from the storage unit 105. The control unit 107 then sends the image switch request (for example, the image switch request output from the operation unit 104) to the display apparatus 200 via the communication unit 106 in accordance with the current operation mode. When an image switch request is received from the display apparatus 200 via the communication unit 106, the control unit 107 acquires the setting information of the current operation mode from the storage unit 105. The control unit 107 then sends the image switch request (for example, the image switch request received from the display apparatus 200) to the layout unit 103 in accordance with the current operation mode.

The combination unit 108 generates displayed image data by combining the OSD image data output from the operation unit 104 with the layout image data output from the layout unit 103. In the image presented by the displayed image data are laid out an image presented by the layout image data (layout image) and an image presented by the OSD image data (OSD image). For example, the displayed image data displays an image in which an OSD image is superimposed on part of the layout image. When no OSD image data is output from the operation unit 104, the layout image data represents the displayed image data. The combination unit 108 outputs the displayed image data to the display unit 109.

The display unit 109 is a display unit capable of executing a single-display and a multi-display. In this embodiment, the display unit displays the image based on the displayed image data output from the combination unit 108 on the display surface. The display unit 109 is a combination of a liquid crystal panel and a backlight module, an organic EL panel, and the like.

Process Flow

One example of a process flow of the display apparatus 100 and display apparatus 200 will be described. Here it is assumed that an image switch operation has been performed for switching the input image data to be used for the single-display on the display apparatus 100 from input image data A to input image data B.

Figure 5:
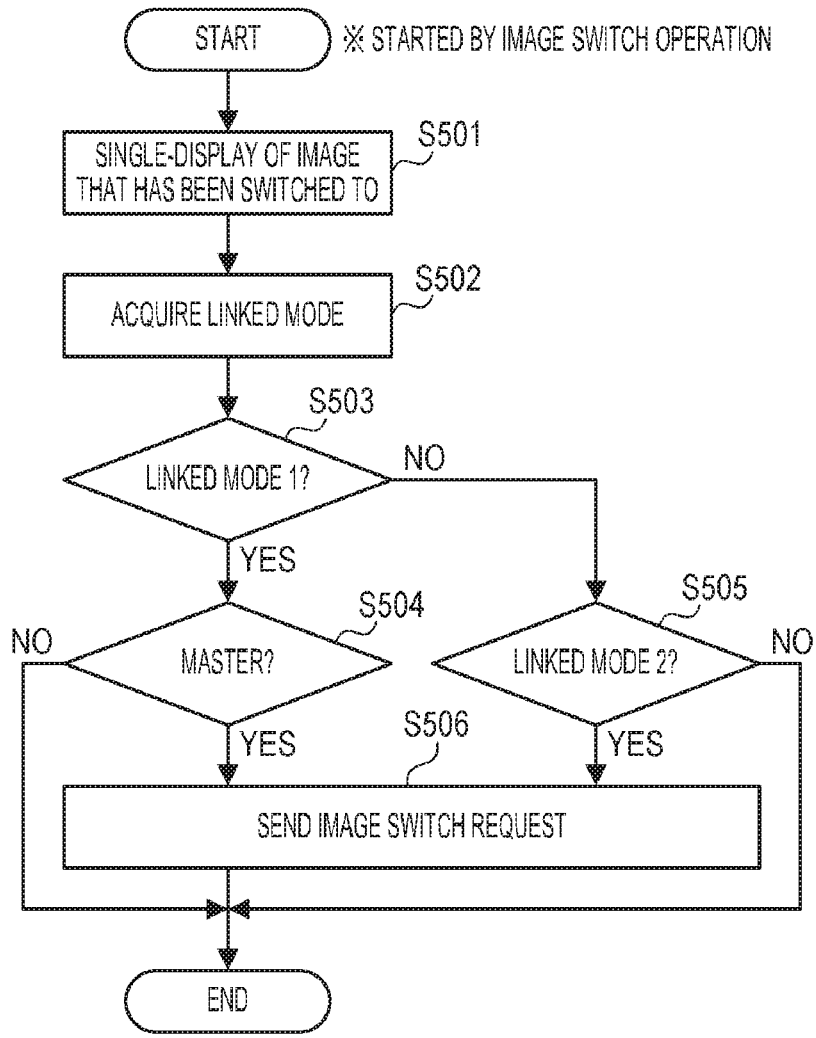
FIG. 5 is a flowchart illustrating one example of a process flow of the display apparatus.

FIG. 5 is a flowchart illustrating one example of the process flow of the display apparatus 100. In response to an image switch operation to the display apparatus 100, the process flow of FIG. 5 is started. Various functional units described below are the functional units provided in the display apparatus 100.

At step S501, the control unit 107 acquires an image switch request from the operation unit 104, and outputs the acquired image switch request to the layout unit 103. The layout unit 103 renews the layout image data in response to the image switch request output from the control unit 107 to allow for a single-display of the input image data B on the display unit 109.

At step S502, the control unit 107 acquires setting information regarding the current operation mode from the storage unit 105.

At step S503, the control unit 107 determines whether or not the current operation mode is Linked Mode 1 (Linked Mode 1 (master) or Linking mode 1 (slave)) based on the setting information acquired at step S502. If the current operation mode is Linked Mode 1, the process goes to step S504, whereas if the current operation mode is not Linked Mode 1 (if the current operation mode is Linked. Mode OFF or Linked Mode 2), the process goes to step S505.

At step S504, the control unit 107 determines whether or not the current operation mode is Linked Mode 1 (master) based on the setting information acquired at step S502. If the current operation mode is Linked Mode 1 (master), the process goes to step S506. If the current operation mode is not Linked Mode 1 (master) (if the current operation mode is Linked Mode 1 (slave)), this process flow is terminated without the image switch request acquired at step S501 being sent to the display apparatus 200.

At step S505, the control unit 107 determines whether or not the current operation mode is Linked Mode 2 based on the setting information acquired at step S502. If the current operation mode is Linked Mode 2, the process goes to step S506. If the current operation mode is not Linked Mode 2 (if the current operation mode is Linked Mode OFF), this process flow is terminated without the image switch request acquired at step S501 being sent to the display apparatus 200.

At step S506, the control unit 107 sends the image switch request acquired at step S501 to the display apparatus 200 via the communication unit 106. As long as the image switch request sent to the display apparatus 200 is an instruction to allow for a single-display on the display apparatus 200 using the same input image data B as that of the single-display on the display apparatus 100, it may be different from the image switch request acquired at step S501.

Figure 6:
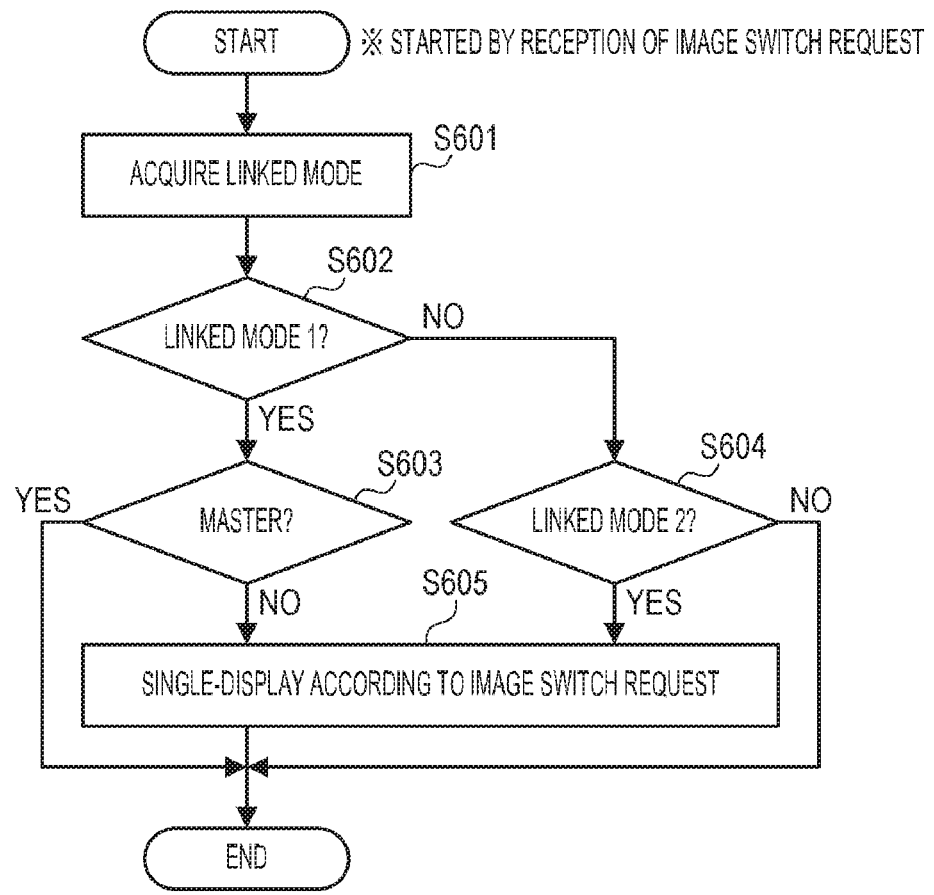
FIG. 6 is a flowchart illustrating one example of a process flow of the display apparatus.

FIG. 6 is a flowchart illustrating one example of the process flow of the display apparatus 200. In response to the display apparatus 200 having received an image switch request from the display apparatus 100, the process flow of FIG. 6 is started. Various functional units described below are the functional units provided in the display apparatus 200.

At step S601, the control unit 107 acquires setting information regarding the current operation mode from the storage unit 105.

At step S602, the control unit 107 determines whether or not the current operation mode is Linked Mode 1 based on the setting information acquired at step S601. If the current operation mode is Linked Mode 1, the process goes to step S603, whereas if the current operation mode is not Linked Mode 1, the process goes to step S604.

At step S603, the control unit 107 determines whether or not the current operation mode is Linked Mode 1 (master) based on the setting information acquired at step S601. If the current operation mode is not Linked Mode 1 (master) (if the current operation mode is Linked Mode 1 (slave)), the process goes to step S605. If the current operation mode is Linked Mode 1 (master), this process flow is terminated without the image switch request received from the display apparatus 100 being responded to.

At step S604, the control unit 107 determines whether or not the current operation mode is Linked Mode 2 based on the setting information acquired at step S601. If the current operation mode is Linked Mode 2, the process goes to step S605. If the current operation mode is not Linked Mode 2 (if the current operation mode is Linked Mode OFF), this process flow is terminated without the image switch request received from the display apparatus 100 being responded to.

At step S605, the control unit 107 outputs the image switch request received from the display apparatus 100 to the layout unit 103. The layout unit 103 renews the layout image data in response to the image switch request output from the control unit 107 to allow for a single-display of the input image data B on the display unit 109. As long as the image switch request output to the layout unit 103 is an instruction to allow for a single-display using the same input image data B as that of the single-display on the display apparatus 100, it may be different from the age switch request received from the display apparatus 100.

With the process described above, a desired image can readily be displayed on each of the display apparatus 100 and display apparatus 200 with a simple configuration.

Figure 7A:
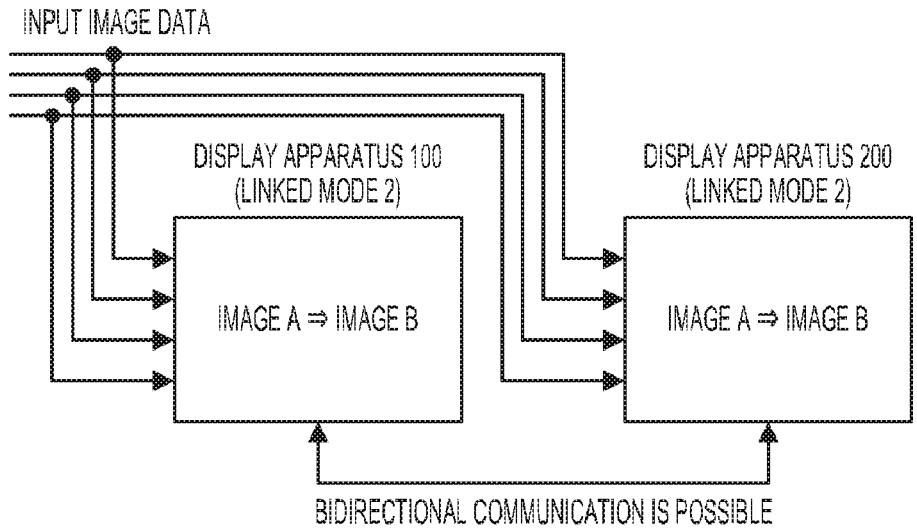
FIG. 7A and FIG. 7B are schematic diagrams illustrating an operation example.

Let us assume now that the display apparatus 100 and display apparatus 200 are set to Linked Mode 2, and an image switch operation has been performed for switching the input image data to be used for a single-display on the display apparatus 100 from input image data A to input image data B. In this case, as shown in FIG. 7A, the input image data to be used for the single-display on the display apparatus 100 is switched to input image data B, in accordance with the image switch operation to the display apparatus 100. An image switch request in accordance with the image switch operation to the display apparatus 100 is automatically sent to the display apparatus 200, so that the input image data to be used for the single-display on the display apparatus 200 is automatically switched to input image data B, too. Similarly, when an image switch operation is performed to the display apparatus 200, the display apparatus 100 and display apparatus 200 are linked to each other to execute the same single-display. Namely, the display apparatus 100 and display apparatus 200 are (bidirectionally) linked to each other.

The display apparatus 100 and display apparatus 200 can be linked to each other this way with a simple configuration where an image switch request having a smaller data size than image data is sent and received between the display apparatus 100 and the display apparatus 200. Since the display apparatus 100 and display apparatus 200 both acquire a plurality of input image data, the display apparatus 100 and display apparatus 200 can be bidirectionally linked to each other, to readily allow for the same single-display on the display apparatus 100 and display apparatus 200. More specifically, both the display apparatus 100 and display apparatus 200 can execute the same single-display irrespective of to which display apparatus the image switch operation is performed.

Figure 7B:
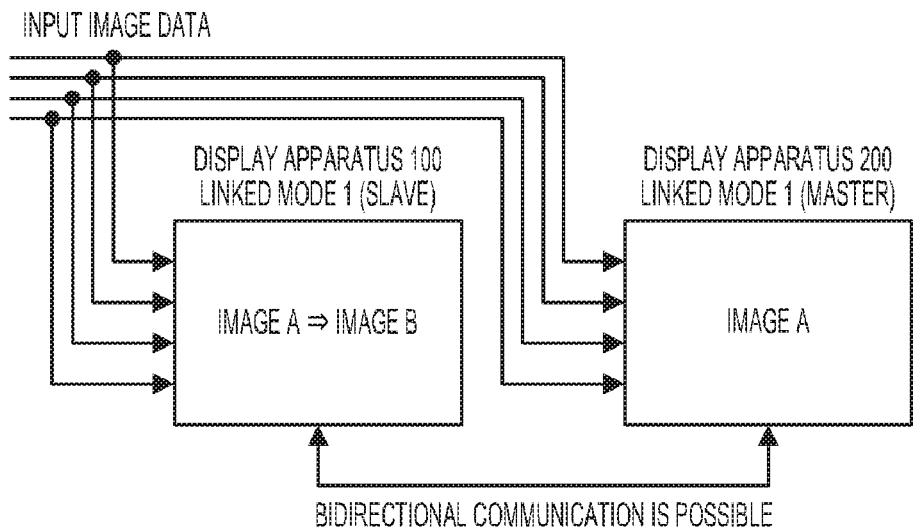

Next, let us assume that the display apparatus 100 is set to Linked Mode 1 (slave) and the display apparatus 200 is set to Linked Mode 1 (master), and an image switch operation has been performed for switching the input image data to be used for a single-display on the display apparatus 100 to input image data B. In this case, as shown in FIG. 7B, the display apparatus 200 does not respond to the image switch operation to the display apparatus 100 (display apparatus 100 and display apparatus 200 are not linked to each other), and the input image data to be used for the single-display on the display apparatus 100 alone is switched. On the other hand, when an image switch operation is performed to the display apparatus 200, the input image data to be used for the single-display on the display apparatus 200 is switched, too, by being linked to the display apparatus 100. Namely, the display apparatus 100 and display apparatus 200 are unidirectionally linked.

This way, the display apparatus 100 and display apparatus 200 can be unidirectionally linked. More specifically, the display apparatus 100 and display apparatus 200 can be linked to each other when an image switch operation is performed to one of the display apparatus 100 and display apparatus 200 that is set to Linked Mode 1 (master). As mentioned above, the display apparatus 100 and display apparatus 200 each acquire a plurality of input image data. Therefore, an image displayed on one of the display apparatus 100 and display apparatus 200 that is set to Linked Mode 1 (slave) can be switched by an image switch operation performed to the display apparatus set to Linked Mode 1 (slave), without linking the display apparatus 100 and display apparatus 200.

Process steps of S506 in FIGS. 5 and S605 in FIG. 6 may be carried out irrespective of the operation mode of the display apparatus 100 or 200.

Second Embodiment

Figure 8:
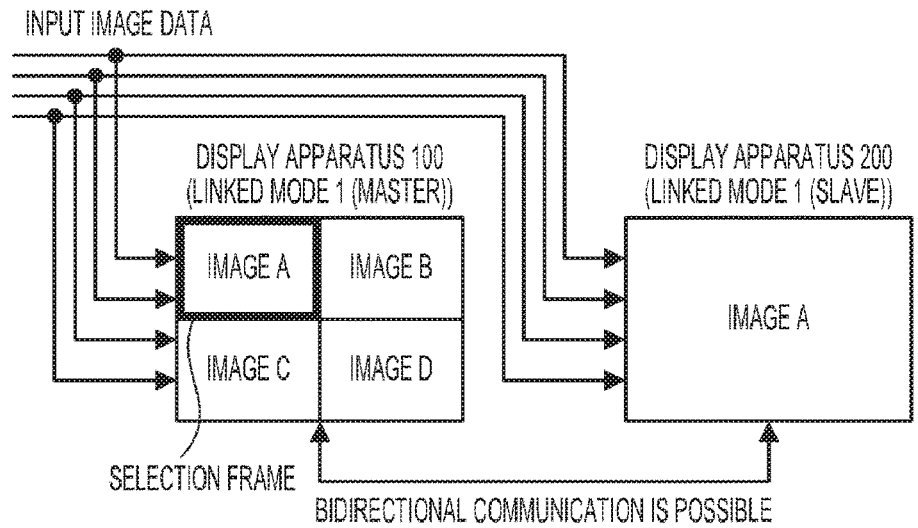
FIG. 8 is a schematic diagram illustrating an operation example.

A second embodiment of the present invention will be described below. One example will be described in this embodiment where control is executed such that an image selected in a multi-display (a display of a plurality of images arrayed on one screen) on one display apparatus is displayed in a single-display on another display apparatus as shown in FIG. 8. Features (configurations, processes and the like) different from the first embodiment will be described in detail below and depiction of the features common to the first embodiment will be omitted.

Configuration of Display Apparatus

One example of the configuration of the display apparatus 100 according to this embodiment will now be described.

The display apparatus 200 has the same configuration as the display apparatus 100. The display apparatus 200 carries out processes described below where "display apparatus 100" is read as "display apparatus 200", and "display apparatus 200" is read as "display apparatus 100".

In this embodiment, the operation unit 104 can receive selection operations that are performed for selecting one of a plurality of images (a plurality of image data) displayed in a multi-display, in a condition where the display unit 109 is executing a multi-display. The operation unit 104 selects one of the plurality of images displayed in a multi-display in accordance with the selection operation, generates OSD image data (image data that indicates a selected image in such a way that the user can intuitively recognize it, such as a selection frame), and outputs the image data to the combination unit 108. The operation unit 104 also outputs an image switch request to the control unit 107 in accordance with the selection operation. The image switch request output in accordance with the selection operation is an instruction to display the image selected in accordance with the selection operation.

In this embodiment, the operation unit 104 may acquire an OSD display request from the control unit 107. The OSD display request is an instruction to switch the condition of a multi-display on the display apparatus 100 to a condition where the image, which was selected in accordance with the selection operation to the display apparatus 200, is selected. The OSD display request has the same data configuration as the image switch request, for example. In response to the OSD display request, the operation unit 104 then carries out the process of switching the condition of a multi-display on the display apparatus 100 to a condition where the image, which was selected in accordance with the selection operation to the display apparatus 200, is selected. In this embodiment, in response to the OSD display request, the operation unit 104 generates OSD image data (image data that indicates an image, which was selected in accordance with the selection operation to the display apparatus 200, in such a way that the user can intuitively recognize it, such as a selection frame), and outputs the image data to the combination unit 108.

In this embodiment, when an image switch request in accordance with a selection operation to the display apparatus 100 is output from the operation unit 104 to the control unit 107, the control unit 107 acquires the setting information of the current operation mode from the storage unit 105. The control unit 107 then sends the image switch request (for example, the image switch request output from the operation unit 104) or the OSD display request to the display apparatus 200 via the communication unit 106 in accordance with the current operation mode. The OSD display request here is an instruction to switch the condition of a multi-display on the display apparatus 200 to a condition where the image, which was selected in accordance with the selection operation to the display apparatus 100, is selected. In the display apparatus 100, the image switch request in accordance with the selection operation to the display apparatus 100 is not output from the control unit 107 to the layout unit 103, so that the multi-display are maintained.

In this embodiment, the control unit 107 may receive an image switch request or an OSD display request from the display apparatus 200 via the communication unit 106. In this case, the control unit 107 acquires setting information regarding the current operation mode from the storage unit 105. The control unit 107 then outputs the image switch request (for example, the image switch request received from the display apparatus 200), or the OSD display request (for example, the OSD display request received from the display apparatus 200) in accordance with the current operation mode. The image switch request is output to the layout unit 103, while the OSD display request is output to the operation unit 104. The OSD display request here is an instruction to switch the condition of a multi-display on the display apparatus 100 to a condition where the image, which was selected in accordance with the selection operation to the display apparatus 200, is selected.

Process Flow

One example of a process flow of the display apparatus 100 and display apparatus 200 according to this embodiment will be described. It is assumed here that a selection operation for selecting input image data B has been performed to the display apparatus 100 that is executing a multi-display.

Figure 9:
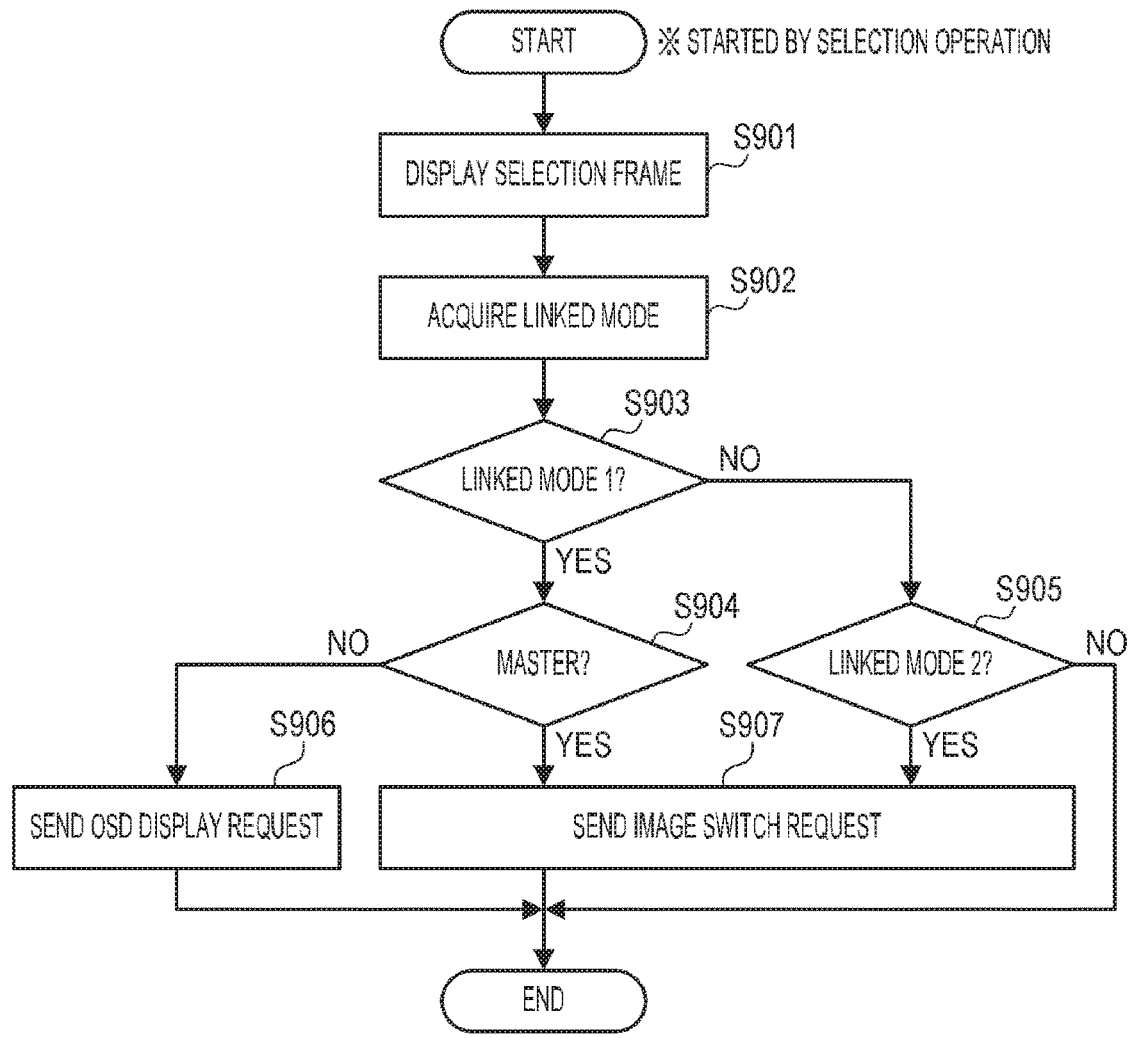
FIG. 9 is a flowchart illustrating one example of a process flow of the display apparatus.

FIG. 9 is a flowchart illustrating one example of the process flow of the display apparatus 100. It is assumed that the display apparatus 100 is executing a multi-display. In response to a selection operation performed to the display apparatus 100, the process flow of FIG. 9 is started. Various functional units described below are the functional units provided in the display apparatus 100.

At step S901, the operation unit 104 generates OSD image data and outputs the data to the combination unit 108. Thereby, a selection frame that indicates the input image data B is displayed in the multi-display of the display apparatus 100. The operation unit 104 also outputs an image switch request (image switch request corresponding to the input image data B) to the control unit 107.

At step S902, the control unit 107 acquires setting information regarding the current operation mode from the storage unit 105.

At step S903, the control unit 107 determines whether or not the current operation mode is Linked Mode 1 based on the setting information acquired at step S902. If the current operation mode is Linked Mode 1, the process goes to step S904, whereas if the current operation mode is not Linked Mode 1, the process goes to step S905.

At step S904, the control unit 107 determines whether or not the current operation mode is Linked Mode 1 (master) based on the setting information acquired at step S902. If the current operation mode is Linked Mode 1 (master), the process goes to step S907. If the current operation mode is not Linked Mode 1 (master) (if the current operation mode is Linked Mode 1 (slave)), the process goes to step S906.

At step S905, the control unit 107 determines whether or not the current operation mode is Linked Mode 2 based on the setting information acquired at step S902. If the current operation mode is Linked Mode 2, the process goes to step S907. If the current operation mode is not Linked Mode 2 (if the current operation mode is Linked Mode OFF), this process flow is terminated without the image switch request and OSD display request being sent to the display apparatus 200.

At step S906, the control unit 107 generates an OSD display request corresponding to the image switch request acquired at step S901 (OSD display request corresponding to the input image data B) and sends it to the display apparatus 200 via the communication unit 106. Here, the image switch request is not sent to the display apparatus 200.

At step S907, the control unit 107 sends the image switch request acquired at step S901 to the display apparatus 200 via the communication unit 106. Here, the OSD display request is not sent to the display apparatus 200. As long as the image switch request sent to the display apparatus 200 is an instruction to allow for a single-display of the input image data B selected by the selection operation to the display apparatus 100 on the display apparatus 200, it may be different from the image switch request acquired at step S901.

Figure 10:
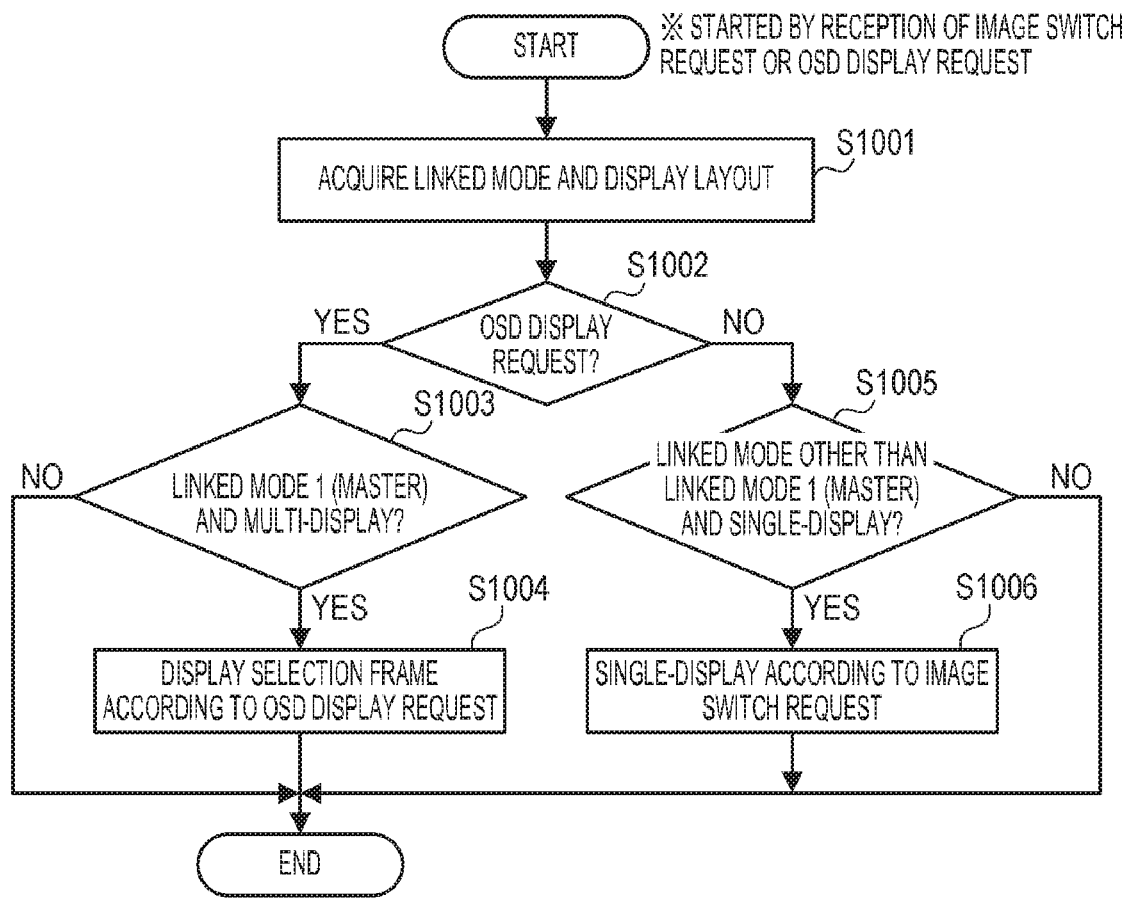
FIG. 10 is a flowchart illustrating one example of a process flow of the display apparatus.

FIG. 10 is a flowchart illustrating one example of the process flow of the display apparatus 200. In response to the display apparatus 200 having received an image switch request or an OSD display request from the display apparatus 100, the process flow of FIG. 10 is started. Various functional units described below are the functional units provided in the display apparatus 200.

At step S1001, the control unit 107 acquires setting information regarding the current operation mode and current display layout from the storage unit 105, At step S1002, the control unit 107 determines whether or not the request received from the display apparatus 100 (received request) is an OSD display request. If the received request is an OSD display request, the process goes to step S1003, whereas if the received request is not an OSD display request (if the received request is an image switch request), the process goes to step S1005.

At step S1003, the control unit 107 determines whether or not the current operation mode is Linked Mode (master) and the current display layout is a multi-display based on the setting information acquired at step S1001. If the current operation mode is Linked Mode 1 (master) and if the current display layout is a multi-display, the process goes to step S1004. If not, this process flow is terminated without the OSD display request received from the display apparatus 100 being responded to. For example, if the current operation mode is Linked Mode 1 (slave), or if the current operation mode is Linked Mode 2, or if the current display layout is a single-display, etc., this process flow is terminated without the OSD display request received from the display apparatus 100 being responded to.

At step S1004, the control unit 107 outputs the OSD display request received from the display apparatus 100 to the operation unit 104. The operation unit 104 generates OSD image data in accordance with the OSD display request output from the control unit 107 and outputs the data to the combination unit 108 so that the selection frame indicating the input image data B is displayed in the multi-display of the display apparatus 200. As long as the OSD display request output to the operation unit 104 is an instruction to switch the condition of a multi-display on the display apparatus 200 to the same condition as the multi-display on the display apparatus 100, it may be different from the OSD display request received from the display apparatus 100.

At step S1005, the control unit 107 determines whether or not the current operation mode is Linked Mode 1 (slave) or Linked Mode 2 and the current display layout is a single-display based on the setting information acquired at step S1001. If the current operation mode is Linked Mode 1 (slave) or Linked Mode 2 and the current display layout is a single-display, the process goes to step S1005. If not, this process flow is terminated without the image switch request received from the display apparatus 100 being responded to. For example, if the current operation mode is Linked Mode 1 (master), or if the current display layout is a multi-display, etc., this process flow is terminated without the image switch request received from the display apparatus 100 being responded to.

At step S1006, the control unit 107 outputs the image switch request received from the display apparatus 100 to the layout unit 103. The layout unit 103 renews the layout image data in response to the image switch request output from the control unit 107 to allow for a single-display of the input image data B on the display unit 109. As long as the image switch request output to the layout unit 103 is an instruction to allow for a single-display of the input image data B selected by the selection operation to the display apparatus 100, it may be different from the image switch request received from the display apparatus 100.

Figure 11:
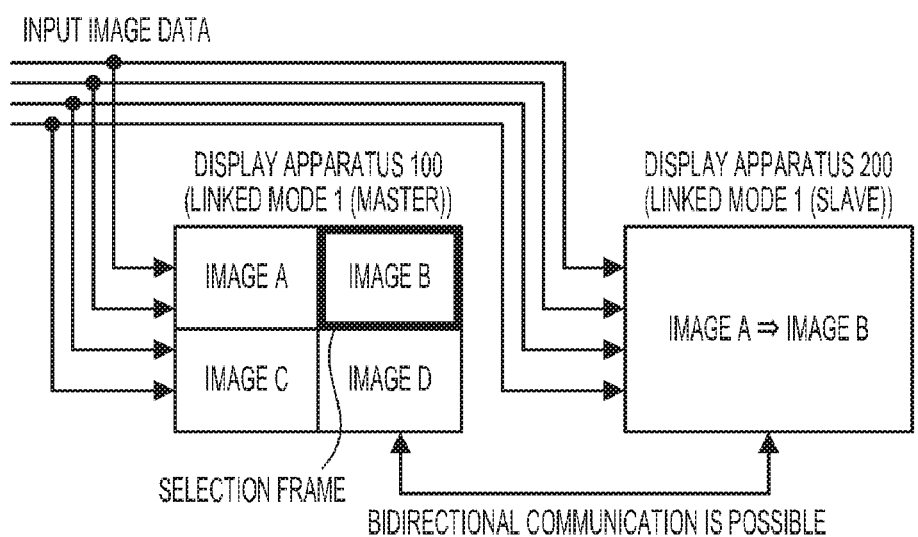
FIG. 11 is a schematic diagram illustrating an operation example.

With the process described above, for example, the display apparatus 100 and display apparatus 200 can be linked to each other such that an image selected in the multi-display on the display apparatus 100 is displayed in a single-display on the display apparatus 200 (FIG. 11). Moreover, the display apparatus 100 and display apparatus 200 can be linked to each other such that the condition of a multi-display on the display apparatus 200 is switched to the same condition as the multi-display on the display apparatus 100. The process described above thus provides the effect of allowing desired images to be readily displayed on each of the display apparatus 100 and display apparatus 200 with a simple configuration.

Process steps of S907 in FIG. 9 and S1006 in FIG. 10 may be carried out irrespective of the operation mode of the display apparatus 100 or 200. Process steps of S906 in FIG. 9 and S1004 in FIG. 10 may be carried out irrespective of the operation mode of the display apparatus 100 or 200.

Third Embodiment

Figure 12:
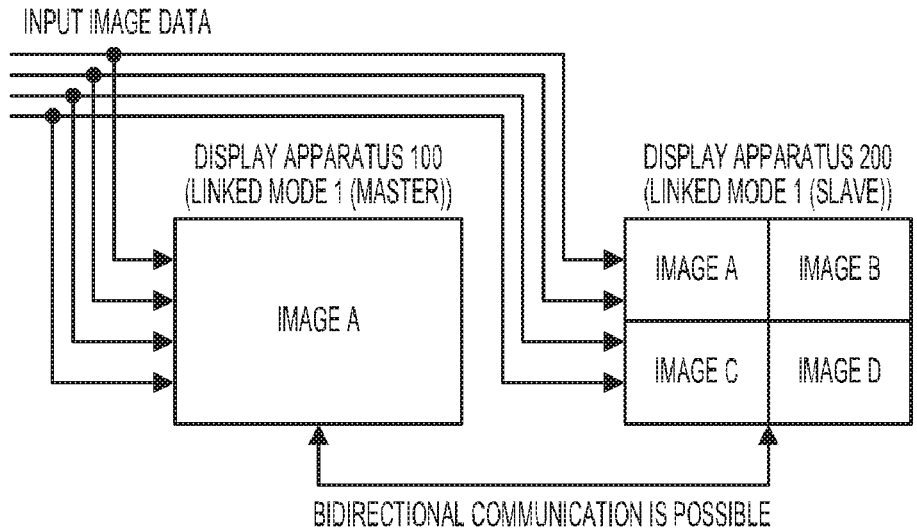
FIG. 12 is a schematic diagram illustrating an operation example.

A third embodiment of the present invention will be described below. In this embodiment, one example will be described where display apparatuses are favorably linked to each other when one display apparatus is executing a single-display while the other display apparatus is executing a multi-display, as shown in FIG. 12. More specifically, one example will be described where, when the display layout of one display apparatus is switched to a multi-display, the display layout of the other display apparatus is switched to a single-display. Features (configurations, processes and the like) different from the first embodiment will be described in detail below and depiction of the features common to the first embodiment will be omitted.

Configuration of Display Apparatus

One example of the configuration of the display apparatus 100 according to this embodiment will now be described. The display apparatus 200 has the same configuration as the display apparatus 100. The display apparatus 200 carries out processes described below where "display apparatus 100" is read as "display apparatus 200", and "display apparatus 200" is read as "display apparatus 100".

In this embodiment, when a display layout in accordance with a layout switch operation to the display apparatus 100 (display layout that is switched to) is output from the operation unit 104 to the control unit 107, the control unit 107 acquires the setting information of the current operation mode from the storage unit 105. The control unit 107 then sends a layout switch request to the display apparatus 200 via the communication unit 106 in accordance with the current operation mode. The layout switch request here is an instruction to switch the display layout of the display apparatus 200. Similarly to the first embodiment, the control unit 107 notifies the layout unit 103 of the display layout notified by the operation unit 104, and records the display layout notified by the operation unit 104 in the storage unit 105 (renewal of the display layout).

In this embodiment, the control unit 107 may receive a layout switch request from the display apparatus 200 via the communication unit 106. The layout switch request here is an instruction to switch the display layout of the display apparatus 100. In this case, the control unit 107 acquires setting information regarding the current operation mode from the storage unit 105. In accordance with the current operation mode, the control unit 107 outputs the display layout in accordance with the layout switch request (display layout that is switched to) to the layout unit 103, and records the information of the display layout corresponding to the layout switch request in the storage unit 105.

Figure 13:
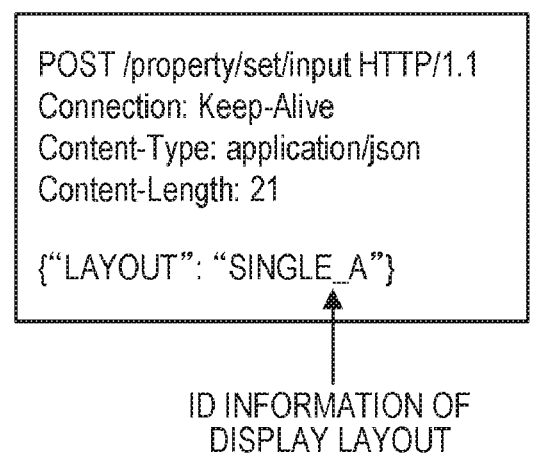
FIG. 13 is a diagram illustrating one example of a layout switch request.

In this embodiment, the communication unit 106 sends and receives layout switch requests to and from the display apparatus 200. For example, a data portion of an HTTP communication, as shown in FIG. 13, is used as the information for identifying the display layout, and sent and received as the layout switch request.

Process Flow

One example of a process flow of the display apparatus 100 and display apparatus 200 according to this embodiment will be described. Here, it is assumed that a layout switch operation has been performed to the display apparatus 100.

Figure 14:
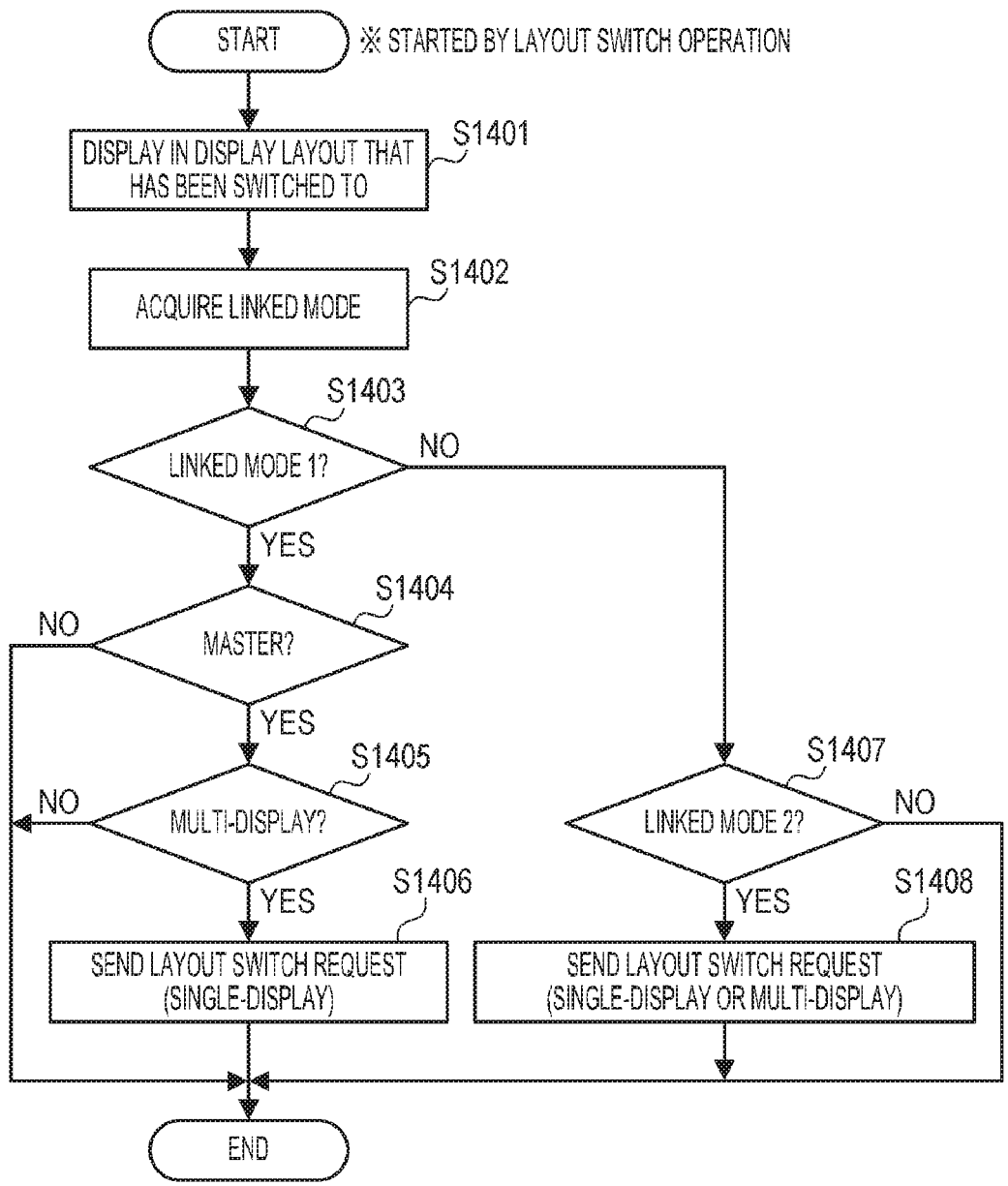
FIG. 14 is a flowchart illustrating one example of a process flow of the display apparatus.

FIG. 14 is a flowchart illustrating one example of the process flow of the display apparatus 100. In response to a layout switch operation performed to the display apparatus 100, the process flow of FIG. 14 is started. Various functional units described below are the functional units provided in the display apparatus 100, At step S1401, the operation unit 104 notifies the control unit 107 of the display layout that is switched to in accordance with the layout switch operation. The control unit 107 records the information of the display layout notified by the operation unit 104 in the storage unit 105, and notifies the layout unit 103 of the display layout notified by the operation unit 104. Consequently, the display layout set in the display apparatus 100 is renewed, and the layout image data is renewed to the image data of the display layout notified by the operation unit 104.

At step S1402, the control unit 107 acquires setting information regarding the current operation mode from the storage unit 105.

At step S1403, the control unit 107 determines whether or not the current operation mode is Linked Mode 1 based on the setting information acquired at step S1402. If the current operation mode is Linked Mode 1, the process goes to step S1404, whereas if the current operation mode is not Linked Mode 1, the process goes to step S1407.

At step S1404, the control unit 107 determines whether or not the current operation mode is Linked Mode 1 (master) based on the setting information acquired at step S1402. If the current operation mode is Linked Mode 1 (master), the process goes to step S1405. If the current operation mode is not Linked Mode 1 (master) (if the current operation mode is Linked Mode 1 (slave)), this process flow is terminated without the layout switch request being sent to the display apparatus 200.

At step S1405, the control unit 107 determines whether or not the current display layout on the display apparatus 100 (display layout notified by the operation unit 104 at step S1401) is a multi-display. If the current display layout is a multi-display, the process goes to step S1406. If the current display layout is not a multi-display (if the current display layout is a single-display), this process flow is terminated without the layout switch request being sent to the display apparatus 200.

At step S1406, the control unit 107 generates a layout switch request for causing the display apparatus 200 to execute a single-display, and sends the request to the display apparatus 200 via the communication unit 106.

At step S1407, the control unit 107 determines whether or not the current operation mode is Linked Mode 2 based on the setting information acquired at step S1402. If the current operation mode is Linked Mode 2, the process goes to step S1408. If the current operation mode is not Linked Mode 2 (if the current operation mode is Linked Mode OFF), this process flow is terminated without the layout switch request being sent to the display apparatus 200.

At step S1408, the control unit 107 generates a layout switch request for causing the display apparatus 200 to execute the same display layout as the display layout of the display apparatus 100, and sends the request to the display apparatus 200 via the communication unit 106. Namely, when the display layout of the display apparatus 100 is switched to a multi-display, a layout switch request for causing the display apparatus 200 to execute a multi-display is generated, and sent to the display apparatus 200. When the display layout of the display apparatus 100 is switched to a single-display, a layout switch request for causing the display apparatus 200 to execute a single-display is generated, and sent to the display apparatus 200.

Figure 15:
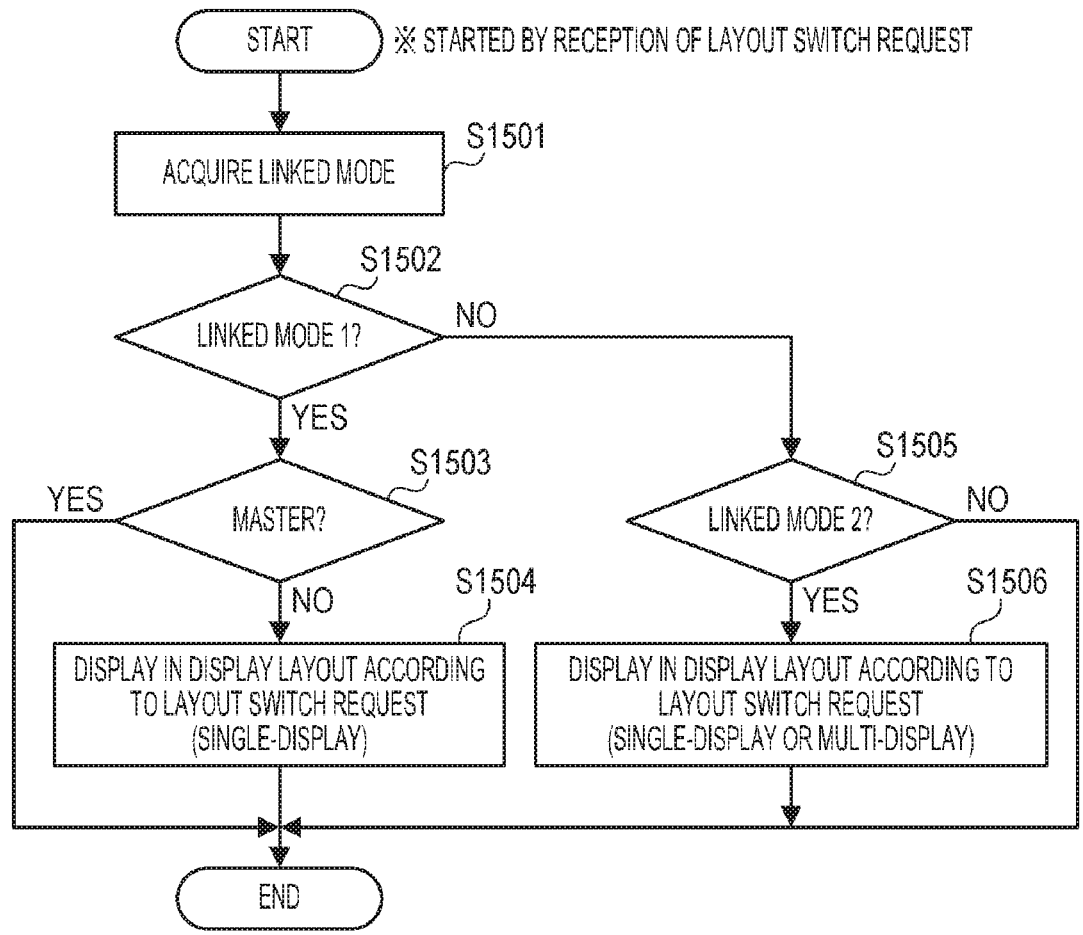
FIG. 15 is a flowchart illustrating one example of a process flow of the display apparatus.

FIG. 15 is a flowchart illustrating one example of the process flow of the display apparatus 200. In response to the display apparatus 200 having received a layout switch request from the display apparatus 100, the process flow of FIG. 15 is started. Various functional units described below are the functional units provided in the display apparatus 200.

At step S1501, the control unit 107 acquires setting information regarding the current operation mode from the storage unit 105.

At step S1502, the control unit 107 determines whether or not the current operation mode is Linked Mode 1 based on the setting information acquired at step S1501. If the current operation mode is Linked Mode 1, the process goes to step S1503, whereas if the current operation mode is not Linked Mode 1, the process goes to step S1505.

At step S1503, the control unit 107 determines whether or not the current operation mode is Linked Mode 1 (master) based on the setting information acquired at step S1501. If the current operation mode is not Linked Mode 1 (master) (if the current operation mode is Linked Mode 1 (slave)), the process goes to step S1504. If the current operation mode is Linked Mode 1 (master), this process flow is terminated without the layout switch request received from the display apparatus 100 being responded to.

At step S1504, the control unit 107 outputs a display layout to the layout unit 103, and records the information of the display layout in the storage unit 105, in accordance with the layout switch request received from the display apparatus 100. Consequently, the display layout set in the display apparatus 200 is renewed, and the layout image data is renewed to the image data of the display layout in accordance with the layout switch request received from the display apparatus 100. If, for example, the display apparatus 100 is set to Linked Mode 1 (master) and the display layout of the display apparatus 100 is switched to a multi-display, a single-display is executed on the display apparatus 200 by the process of step S1504.

At step S1505, the control unit 107 determines whether or not the current operation mode is Linked Mode 2 based on the setting information acquired at step S1501. If the current operation mode is Linked Mode 2, the process goes to step S1506. If the current operation mode is not Linked Mode 2 (if the current operation mode is Linked Mode OFF), this process flow is terminated without the layout switch request received from the display apparatus 100 being responded to.

At step S1506, the control unit 107 outputs a display layout to the layout unit 103, and records the information of the display layout in the storage unit 105, in accordance with the layout switch request received from the display apparatus 100. Consequently, the display layout set in the display apparatus 200 is renewed, and the layout image data is renewed to the image data of the display layout in accordance with the layout switch request received from the display apparatus 100. If for example, the display apparatus 100 is set to Linked Mode 2, the display apparatus 200 displays the same display layout (single-display or multi-display) as the display layout of the display apparatus 100, by the process of step S1506.

Figure 16:
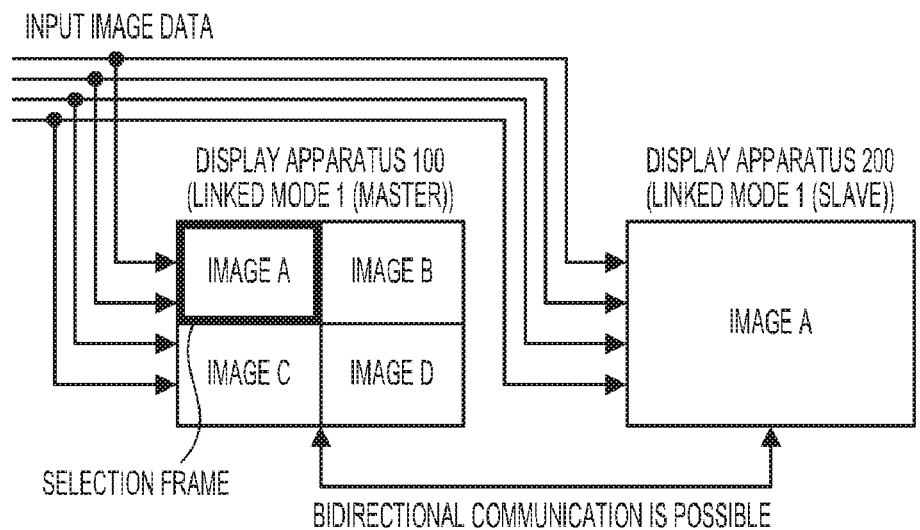
FIG. 16 is a schematic diagram illustrating an operation example.

With the process described above, the display apparatus 100 and display apparatus 200 can be linked to each other such that the display layout of the display apparatus 200 is switched to a single-display in response to the switching of the display layout of the display apparatus TOO to a multi-display (FIG. 16). Moreover, the display apparatus 100 and display apparatus 200 can be linked to each other such that the display layout of the display apparatus 200 is switched to the same display layout as the display apparatus 100 in response to the switching of the display layout of the display apparatus 100. The process described above also provides the effect of allowing for easy switching of respective display layouts of the display apparatus 100 and display apparatus 200 to a desired display layout with a simple configuration.

Process steps of S1406 in FIG. 14 and S1504 in FIG. 15 may be carried out irrespective of the operation mode of the display apparatus 100 or 200. Process steps of S1408 in FIGS. 14 and S1506 in FIG. 15 may be carried out irrespective of the operation mode of the display apparatus 100 or 200. The layout change request may contain information indicative of the operation mode of the sender (display apparatus) of the layout switch request. Provided that the operation mode of the display apparatus 100 is Linked Mode 1 (master) and the operation mode of the display apparatus 200 is Linked Mode 1 (slave), the step S1504 may be carried out. Provided that the operation mode of the display apparatus 100 and the operation mode of the display apparatus 200 are both Linked Mode 2, the step S1506 may be carried out.

Various functional units of the first to third embodiments (FIG. 2) may be separate hardware devices, or not. The functions of two or more functional units may be realized by a common hardware device. Each of a plurality of functions of one functional unit may be realized by separate hardware devices. Two or more functions of one functional unit may be realized by a common hardware device. Each functional unit may be realized by a hardware device, or not. For example, the apparatus may have a processor, and a memory that stores control programs. The functions of at least some functional units of the apparatus may be realized by the processor reading out the control programs from the memory and executing the programs.

It should be understood that the first to third embodiments (including modified examples) described above are only examples, and any configurations obtained by suitably altering or modifying the configurations of the first to third embodiments within the scope of the gist of the present invention are also included in the present invention. Any configurations obtained by suitably combining the configurations of the first to third embodiments are also included in the present invention.

According to this disclosure, desired images can readily be displayed on discrete display apparatuses with a simple configuration.

Other Embodiments

Embodiment(s) of the present invention can also be realized by a computer of a system or apparatus that reads out and executes computer executable instructions (a g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No 2019-018724, filed on Feb. 5, 2019, which is hereby incorporated by reference herein in its entirety.

What is claimed is:

1. A display apparatus for displaying an image on a display, the display apparatus comprising:
    an acquisition interface configured to acquire a plurality of image data;
    a communication interface configured to communicate with an other display apparatus acquiring the plurality of image data;
    a reception interface configured to receive an operation for selecting one image data which is used for displaying an image on the display, among the plurality of image data; and
    at least one memory and at least one processor which function as:
    selecting one image data among the plurality of image data in accordance with the operation received by the reception interface;
    controlling the display to display an image based on selected image data among the plurality of image data; and
    controlling communication with the other display apparatus via the communication interface so that the other display apparatus displays an image corresponding to the selected image data among the plurality of image data;
    setting one of a plurality of modes based on an operation received by the reception interface, the plurality of modes including:
    a first mode in which the display apparatus communicates with the other display apparatus so that the other display apparatus displays an image based on the selected image data, and the display apparatus does not respond to an instruction from the other display apparatus specifying image data for displaying an image on the display,
    a second mode in which the display apparatus does not communicate with the other display apparatus to cause the other display apparatus to an image based on the selected image data, and in response to an instruction from the other display apparatus specifying image data for displaying an image on the display, the display apparatus displays this image, and
    a third mode in which the display apparatus communicates with the other display apparatus so that the other display apparatus displays an image based on the selected image data, and, in response to an instruction from the other display apparatus specifying image data for displaying an image on the display, displays this image.

2. The display apparatus according to claim 1, wherein the at least one memory and at least one processor further function as:
    controlling communication with the other display apparatus via the communication interface such that, in a case where a multi-display, in which a plurality of images respectively corresponding to the plurality of image data are arrayed and displayed on the display, being executed, in response to reception of an instruction to select one of the plurality of images, an image based on image data corresponding to a selected image is displayed on the other display apparatus.

3. The display apparatus according to claim 2, wherein:
    in the first mode, in a case where the multi-display being executed, in response to reception of an instruction to select one of the plurality of images, the display apparatus communicates with the other display apparatus so that the other display apparatus displays an image based on image data corresponding to a selected image, and
    in the second mode, in a case where the multi-display being executed, even when an instruction to select one of the plurality of images is received, the display apparatus does not communicate with the other display apparatus so that the other display apparatus displays an image based on image data corresponding to a selected image.

4. The display apparatus according to claim 1, wherein the at least one memory and at least one processor further function as:
    controlling communication with the other display apparatus via the communication interface such that, in a case where the display apparatus and the other display apparatus executing a multi-display, in which a plurality of images respectively corresponding to the plurality of image data are arrayed and displayed, in response to reception of an instruction to select one of the plurality of images, an image based on image data corresponding to a selected image is selected from the plurality of images displayed on the other display apparatus.

5. The display apparatus according to claim 1, wherein each of the display apparatus and the other display apparatus is capable of executing a single-display in which one of a plurality of images respectively corresponding to the plurality of image data is displayed, and a multi-display in which the plurality of images are arrayed and displayed, and the at least one memory and at least one processor further function as:

controlling communication with the other display apparatus via the communication interface such that an image is displayed in the single-display on the other display apparatus in a case where the multi-display being executed in the display.

6. The display apparatus according to claim 1, wherein the acquisition interface is a plurality of input terminals to which the plurality of image data are respectively inputted.

7. A control method of a display apparatus for displaying an image on a display, the display apparatus comprising:

an acquisition interface configured to acquire a plurality of image data;

a communication interface configured to communicate with an other display apparatus acquiring the plurality of image data; and a reception interface configured to receive an operation for selecting one image data which is used for displaying an image on the display, among the plurality of image data, and the control method comprising:

selecting one image data among the plurality of image data in accordance with the operation received by the reception interface;

controlling the display to display an image based on selected image data among the plurality of image data;

controlling communication with the other display apparatus via the communication interface so that the other display apparatus displays an image corresponding to the selected image data among the plurality of image data; and setting one of a plurality of modes based on an operation received by the reception interface, the plurality of modes including:

a first mode in which the display apparatus communicates with the other display apparatus so that the other display apparatus displays an image based on the selected image data, and the display apparatus does not respond to an instruction from the other display apparatus specifying image data for displaying an image on the display, a second mode in which the display apparatus does not communicate with the other display apparatus to cause the other display apparatus to an image based on the selected image data, and in response to an instruction from the other display apparatus specifying image data for displaying an image on the display, the display apparatus displays this image, and a third mode in which the display apparatus communicates with the other display apparatus so that the other display apparatus displays an image based on the selected image data, and, in response to an instruction from the other display apparatus specifying image data for displaying an image on the display, displays this image.

8. The control method according to claim 7, further comprising:

controlling communication with the other display apparatus via the communication interface such that, in a case where a multi-display, in which a plurality of images respectively corresponding to the plurality of image data are arrayed and displayed on the display, being executed, in response to reception of an instruction to select one of the plurality of images, an image based on image data corresponding to a selected image is displayed on the other display apparatus.

9. The control method according to claim 8, wherein:

in the first mode, in a case where the multi-display being executed, in response to reception of an instruction to select one of the plurality of images, the display apparatus communicates with the other display apparatus so that the other display apparatus displays an image based on image data corresponding to a selected image, and in the second mode, in a case where the multi-display being executed, even when an instruction to select one of the plurality of images is received, the display apparatus does not communicate with the other display apparatus so that the other display apparatus displays an image based on image data corresponding to a selected image.

10. The control method according to claim 7, further comprising:

controlling communication with the other display apparatus via the communication interface such that, in a case where the display apparatus and the other display apparatus executing a multi-display, in which a plurality of images respectively corresponding to the plurality of image data are arrayed and displayed, in response to reception of an instruction to select one of the plurality of images, an image based on image data corresponding to a selected image is selected from the plurality of images displayed on the other display apparatus.

11. The control method according to claim 7, wherein each of the display apparatus and the other display apparatus is capable of executing a single-display in which one of a plurality of images respectively corresponding to the plurality of image data is displayed, and a multi-display in which the plurality of images are arrayed and displayed, and the control method further comprises:

controlling communication with the other display apparatus via the communication interface such that an image is displayed in the single-display on the other display apparatus in a case where the multi-display being executed in the display.

12. The control method according to claim 7, wherein the acquisition interface is a plurality of input terminals to which the plurality of image data are respectively inputted.

13. A non-transitory computer readable medium that stores a program, wherein the program causes a computer to execute a control method of a display apparatus for displaying an image on a display, the display apparatus comprising:

an acquisition interface configured to acquire a plurality of image data;

a communication interface configured to communicate with an other display apparatus acquiring the plurality of image data; and a reception interface configured to receive an operation for selecting one image data which is used for displaying an image on the display, among the plurality of image data, and the control method comprising:

selecting one image data among the plurality of image data, in accordance with the operation received by the reception interface;

controlling the display to display an image based on selected image data among the plurality of image data;

controlling communication with the other display apparatus via the communication interface so that the other display apparatus displays an image corresponding to the selected image data among the plurality of image data; and setting one of a plurality of modes based on an operation received by the reception interface, the plurality of modes including:

a first mode in which the display apparatus communicates with the other display apparatus so that the other display apparatus displays an image based on the selected image data, and the display apparatus does not respond to an instruction from the other display apparatus specifying image data for displaying an image on the display, a second mode in which the display apparatus does not communicate with the other display apparatus to cause the other display apparatus to an image based on the selected image data, and in response to an instruction from the other display apparatus specifying image data for displaying an image on the display, the display apparatus displays this image, and a third mode in which the display apparatus communicates with the other display apparatus so that the other display apparatus displays an image based on the selected image data, and, in response to an instruction from the other display apparatus specifying image data for displaying an image on the display, displays this image.

* * * * *